(12) United States Patent
Snyder et al.

(10) Patent No.: US 10,090,682 B2
(45) Date of Patent: Oct. 2, 2018

(54) SYSTEM FOR TRANSFERRING CONTROL OF CHARGE CURRENT

(71) Applicant: SAFT AMERICA, INC., Jacksonville, FL (US)

(72) Inventors: James G. Snyder, Hanover, PA (US); Benjamin L. Foote, Baltimore, MD (US); Keith W. Hensley, Baltimore, MD (US); Shih-xiang Liu, Ellicott City, MD (US)

(73) Assignee: SAFT AMERICA, INC., Cockeysville, MD (US)

( * ) Notice: Subject to any disclaimer, the term of this patent is extended or adjusted under 35 U.S.C. 154(b) by 320 days.

(21) Appl. No.: 14/412,009

(22) PCT Filed: Jun. 20, 2013

(86) PCT No.: PCT/US2013/046827
§ 371 (c)(1),
(2) Date: Dec. 30, 2014

(87) PCT Pub. No.: WO2014/007996
PCT Pub. Date: Jan. 9, 2014

(65) Prior Publication Data
US 2015/0180257 A1    Jun. 25, 2015

Related U.S. Application Data

(60) Provisional application No. 61/667,484, filed on Jul. 3, 2012.

(51) Int. Cl.
*H02J 7/00* (2006.01)
*H01M 10/44* (2006.01)
(Continued)

(52) U.S. Cl.
CPC ....... *H02J 7/0013* (2013.01); *H01M 10/0525* (2013.01); *H01M 10/425* (2013.01);
(Continued)

(58) Field of Classification Search
CPC ................. H02J 7/0013; H02J 7/0026; H02J 2007/0037; H02J 7/0016; H01M 10/441
(Continued)

(56) References Cited

U.S. PATENT DOCUMENTS

| 5,504,413 A | 4/1996 | Fernandez et al. | |
|---|---|---|---|
| 2005/0194937 A1* | 9/2005 | Jacobs | H02J 7/0018 320/135 |

(Continued)

OTHER PUBLICATIONS

International Search Report and Written Opininon for PCT/US2013/046827 dated Mar. 20, 2014.

*Primary Examiner* — Richard Isla Rodas
*Assistant Examiner* — Manuel Hernandez
(74) *Attorney, Agent, or Firm* — Moore & Van Allen PLLC; Peter B. Stewart

(57) ABSTRACT

The invention is directed to a system for controlling battery current. In some embodiments, the system comprises a first lithium-ion (Li-ion) battery, the first battery having a first state-of-charge (SOC) and comprising a first battery controller and a first battery charger; and a second Li-ion battery in series with the first battery, the second battery having a second SOC and comprising a second battery controller and a second battery charger. In some embodiments, at least one of the first battery controller or the second battery controller controls a charge current flowing through at least one of the first battery and the second battery, wherein control of the charge current is transferred from the first battery to the second battery based at least partially on whether an overhead voltage is present across the first battery charger or the second battery charger.

28 Claims, 5 Drawing Sheets

(51) Int. Cl.
*H01M 10/46* (2006.01)
*H01M 10/0525* (2010.01)
*H01M 10/42* (2006.01)
*H01M 10/48* (2006.01)

(52) U.S. Cl.
CPC ..... *H01M 10/4257* (2013.01); *H01M 10/441* (2013.01); *H01M 10/46* (2013.01); *H01M 10/482* (2013.01); *H02J 7/007* (2013.01); *H02J 7/0022* (2013.01); *H01M 2010/4271* (2013.01); *H01M 2200/00* (2013.01); *H02J 7/0016* (2013.01); *H02J 7/0026* (2013.01); *H02J 7/0054* (2013.01); *H02J 2007/0037* (2013.01)

(58) Field of Classification Search
USPC ................. 320/116, 118, 119, 120, 121, 122
See application file for complete search history.

(56) References Cited

U.S. PATENT DOCUMENTS

| | | | |
|---|---|---|---|
| 2006/0261783 A1* | 11/2006 | Gamboa | H01M 10/425 320/138 |
| 2009/0058370 A1 | 3/2009 | Odaohhara | |
| 2011/0050180 A1 | 3/2011 | Ko | |
| 2011/0193518 A1* | 8/2011 | Wright | H01M 10/44 320/101 |
| 2012/0019209 A1 | 1/2012 | Fink | |
| 2012/0133329 A1* | 5/2012 | Yoshida | H01M 10/441 320/116 |
| 2012/0319657 A1* | 12/2012 | Ke | H02J 7/0021 320/134 |
| 2013/0100710 A1* | 4/2013 | Kang | H02H 9/04 363/21.12 |

\* cited by examiner

SYSTEM FOR TRANSFERRING CONTROL OF CHARGE CURRENT

BACKGROUND

There is a need for a battery that produces high output current with a low voltage drop across the battery and low power dissipation. Additionally, there is a need for a battery control system that provides better control over various functions associated with a battery.

BRIEF SUMMARY

Embodiments of the invention are directed to systems, methods and computer program products associated with a battery. In some embodiments, an exemplary system for controlling charge current comprises: a first lithium-ion (Li-ion) battery, the first battery having a first state-of-charge (SOC), the first battery comprising at least one cell, a first battery controller, a first battery charger, and a first transistor array including at least one transistor; and a second Li-ion battery in series with the first battery, the second battery having a second SOC, the second battery comprising at least one cell, a second battery controller, a second battery charger, and a second transistor array including at least one transistor, wherein at least one of the first battery controller or the second battery controller controls a charge current flowing through at least one of the first battery and the second battery, wherein control of the charge current is transferred from the first battery to the second battery based at least partially on whether an overhead voltage is present across the first battery charger or the second battery charger.

In some embodiments, the first battery controller sets a charge rate of the first battery to be less than a charge rate of the second battery, which causes the overhead voltage to appear across the first battery charger. Alternately, when the first battery controller sets a charge rate of the first battery to be greater than a charge rate of the second battery, the overhead voltage will not appear across the first battery charger. In some embodiments, the overhead voltage jumps from the first battery to the second battery after a predetermined period of time.

In some embodiments, control of the charge current is transferred from the first battery to the second battery based at least partially on at least one of a duration between the previous transfers of control of the charge current between the batteries, or a variation in amplitude of the charge current flowing through at least one of the first battery and the second battery.

In some embodiments, control of the charge current is transferred from the first battery to the second battery based on at least one of a state of charge, a state of balance, a thermal load, or an end-of-charge detection event associated with at least one of the first battery or the second battery.

In some embodiments, control of the charge current is transferred from the first battery to the second battery based on data exchanged between the first battery and the second battery.

In some embodiments, control of the charge current is transferred from the first battery to the second battery as a means of data exchange between the first battery and the second battery.

In some embodiments, the first battery further comprises a bypass module, the bypass module being activated when the first SOC is greater than or equal to a threshold SOC such that that the bypass module diverts the charge current around the first battery, and the bypass module additionally providing heat to the first battery when bypass current is flowing, which is desirable when a temperature associated with the first battery drops below a threshold temperature.

In some embodiments, the first battery further comprises at least one isolated bidirectional converter to transfer energy from a first cell to a second cell comprised in the first battery.

In some embodiments, the first battery controller determines whether a third SOC associated with a first cell comprised in the first battery is different from a fourth SOC associated with a second cell comprised in the first battery and if sufficient difference exists, to engage the isolated bidirectional converter so as to reduce the difference and bring the cells into balance.

In some embodiments, the first battery further comprises an overload protection module for performing the steps of: measuring the discharge current flowing through the first battery, comparing the measured discharge current with a first reference value, and in response to determining the measured discharge current is greater than or equal to the first reference value, setting an overload signal that triggers at least one of deactivation of the first transistor array or disabling of the first battery output.

In some embodiments, the overload protection module further performs the steps of: comparing the measured discharge current with a second reference value, wherein the second reference value is less than or equal to the first reference value, starting a countdown period, and reducing the first reference value upon expiration of the countdown period.

In some embodiments, the first battery further comprises a reserve protection module for performing the steps of: comparing the first SOC to a plurality of values stored in a memory module, determining whether the first SOC is less than or equal to a warning value, in response to determining the first SOC is less than or equal to the warning value, sending a warning message to a device located external to the first battery (such as the host vehicle controller), and in response to not receiving an override command from the device within a predetermined period of time and in response to determining the first SOC reduces to an alarm value, deactivating the first battery output, wherein the alarm value is less than or equal to the warning value.

In some embodiments, the first battery further comprises a varistor for controlling an inductive kick associated with deactivation of the first transistor array.

In some embodiments, the first battery controller detects presence of a charge source based at least partially on the first battery controller's determination of a voltage between the at least one cell comprised in the first battery and a terminal voltage.

In some embodiments, the first battery controller determines discharge associated with the first battery based at least partially on determining a current through at least one resistor in parallel with the first transistor array.

In some embodiments, the first battery further comprises an ideal diode circuit for performing the steps of: monitoring a forward voltage across at least one transistor located in the first battery, adjusting the at least one transistor's gate voltage such that the forward voltage is less than a threshold voltage, and in response to determining at least one of a reversal of the forward voltage across the at least one transistor or a reduction in the forward voltage such that the forward voltage is less than or equal to a second, lower, threshold voltage, deactivating the at least one transistor.

In some embodiments, the first battery charger is a switching charger, wherein the switching charger comprises a step-down buck converter.

In some embodiments, at least one of the first battery controller or a module associated with the first battery performs the steps of: limiting a charge rate for the first battery when a temperature associated with the first battery is less than a first temperature threshold, determining that the first SOC is less than a SOC threshold, in response to determining the first SOC is less than the SOC threshold, activating a resistive heater to provide heat to the at least one cell comprised in the first battery, and deactivating the resistive heater when the temperature associated with the first battery is determined to be greater than or equal to a temperature threshold.

In some embodiments, the first battery transitions from an active mode to a sleep mode when at least one of: the charge current remains below a threshold amount for a predetermined period of time, or a change associated with the first SOC does not exceed a threshold amount of change over a predetermined period of time, and wherein the first transistor array is deactivated when the first battery transitions from the active mode to the sleep mode.

In some embodiments, the first battery controller determines a cell SOC associated with a cell in the first battery and stores the cell SOC in a memory module comprised in the first battery. Additionally, the first battery controller determines the cell SOC based at least partially on at least one of: measuring a current through the cell, or measuring a voltage across the cell, and converting the measured voltage to the cell SOC based at least partially on accessing a database comprising a list of known voltages versus SOC values.

In some embodiments, when the first battery transitions from a sleep mode to an active mode, the first battery controller: determines a first cell SOC based at least partially on at least one of a self-discharge rate associated with a cell in the battery, or a storage time associated with the cell, determines a second cell SOC based at least partially on measuring a voltage across the cell, and converting the measured voltage to the second cell SOC based at least partially on accessing a database comprising a list of known voltages versus SOC values, determines whether the first cell SOC is more reliable than the second cell SOC, and stores the more reliable SOC between the first cell SOC and the second cell SOC as an updated SOC value for the cell.

In some embodiments, at least one of the first transistor array or the second transistor array is positioned on at least one of a high-side rail or a low-side rail comprised in the system.

In some embodiments, a current flowing through the first battery is determined based at least partially one at least one of: a voltage across a shunt resistor, a temperature associated with the first transistor array or a voltage across the first transistor array.

In some embodiments, an exemplary method for controlling charge current comprises: providing a first lithium-ion (Li-ion) battery, the first battery having a first state-of-charge (SOC), the first battery comprising at least one cell, a first battery controller, a first battery charger, and a first transistor array including at least one transistor; providing a second Li-ion battery in series with the first battery, the second battery having a second SOC, the second battery comprising at least one cell, a second battery controller, a second battery charger, and a second transistor array including at least one transistor; controlling, using at least one of the first battery controller or the second battery controller, a current flowing through both batteries; and transferring control of the current from the first battery to the second battery based at least partially on whether an overhead voltage is present across the first battery charger or the second battery charger.

BRIEF DESCRIPTION OF THE DRAWINGS

Figure 1:
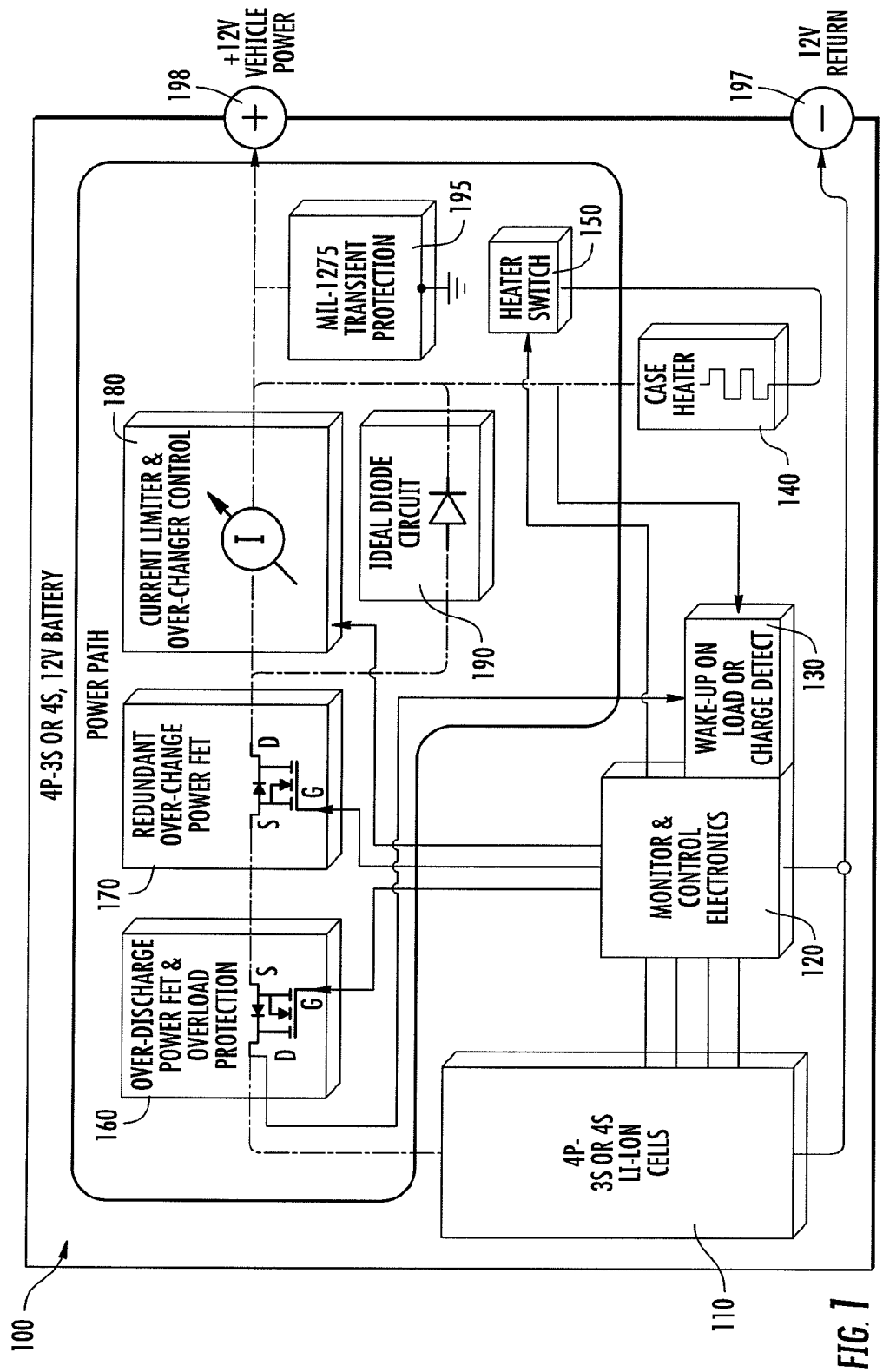
Figure 2A:
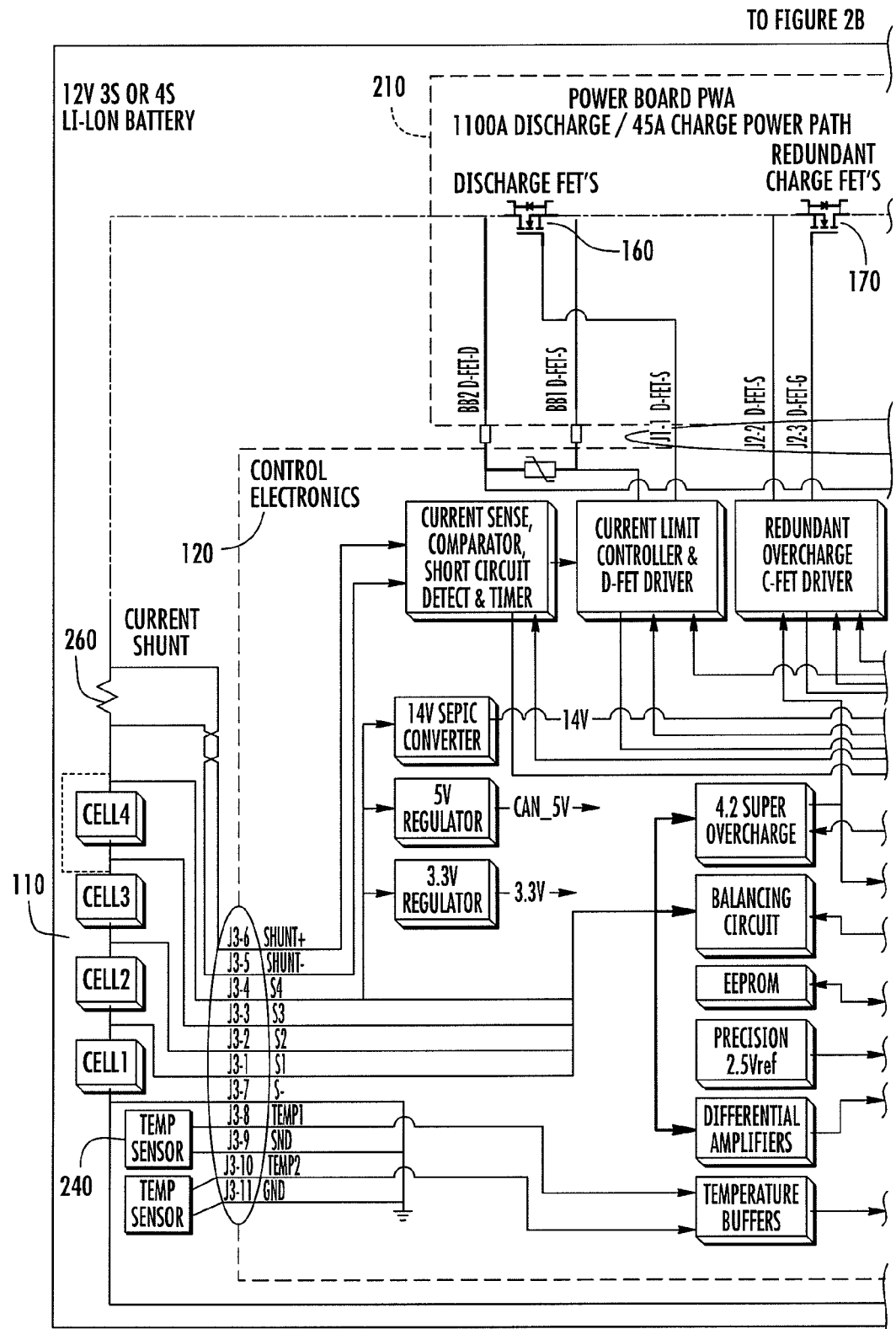
Figure 2B:
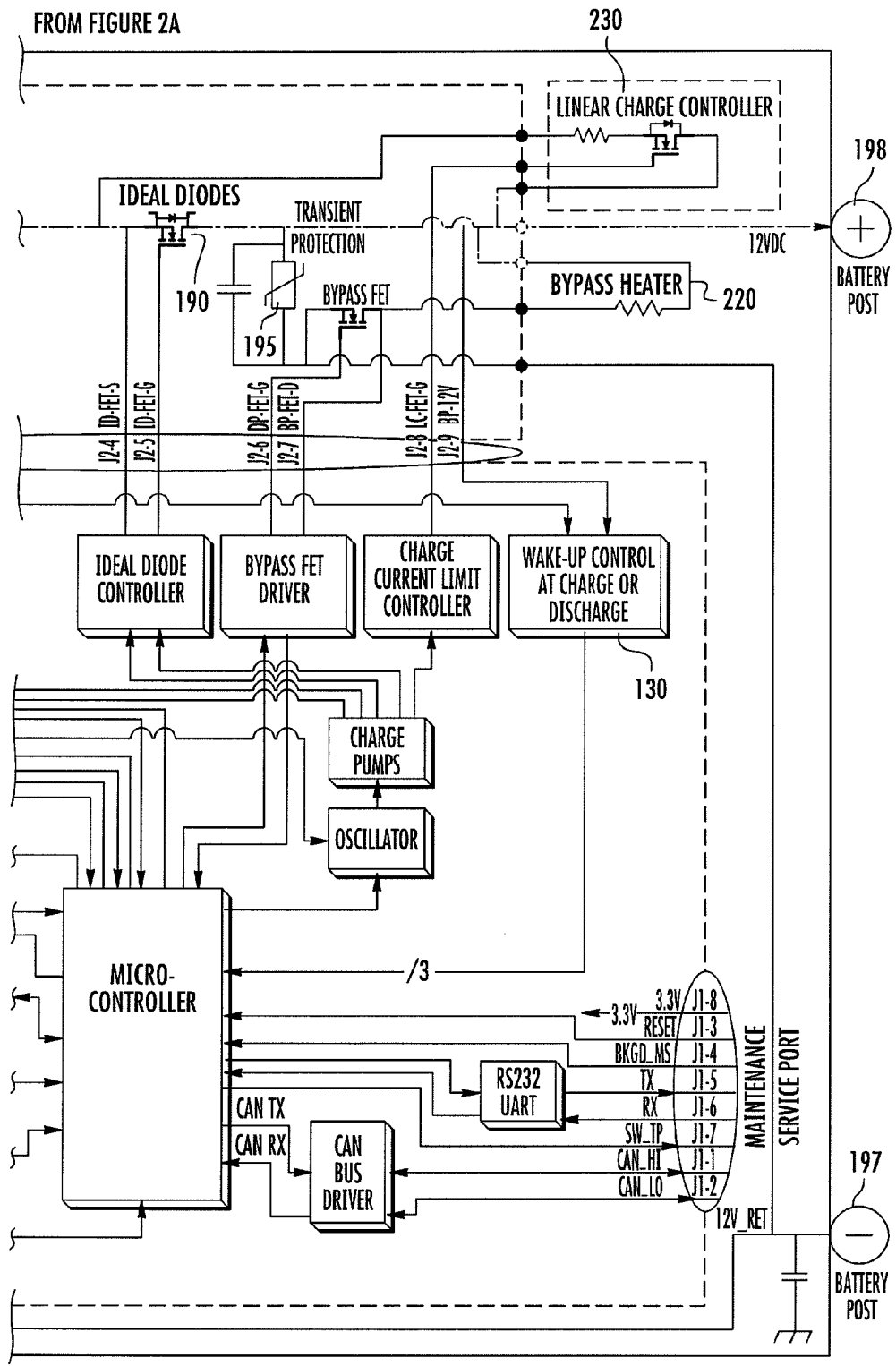
Figure 3:
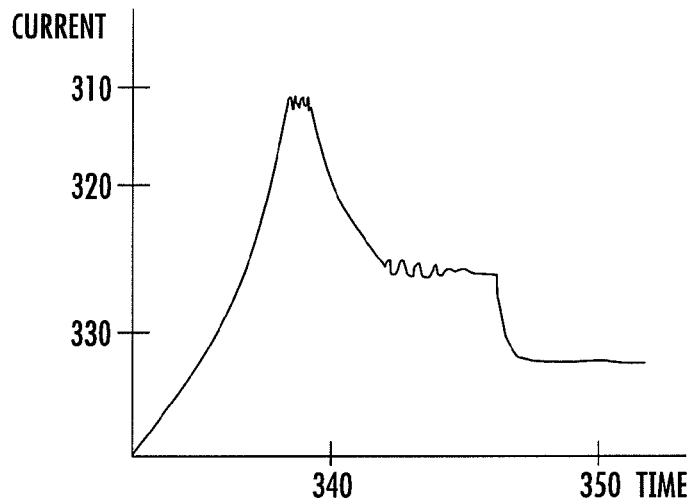
Figure 4:
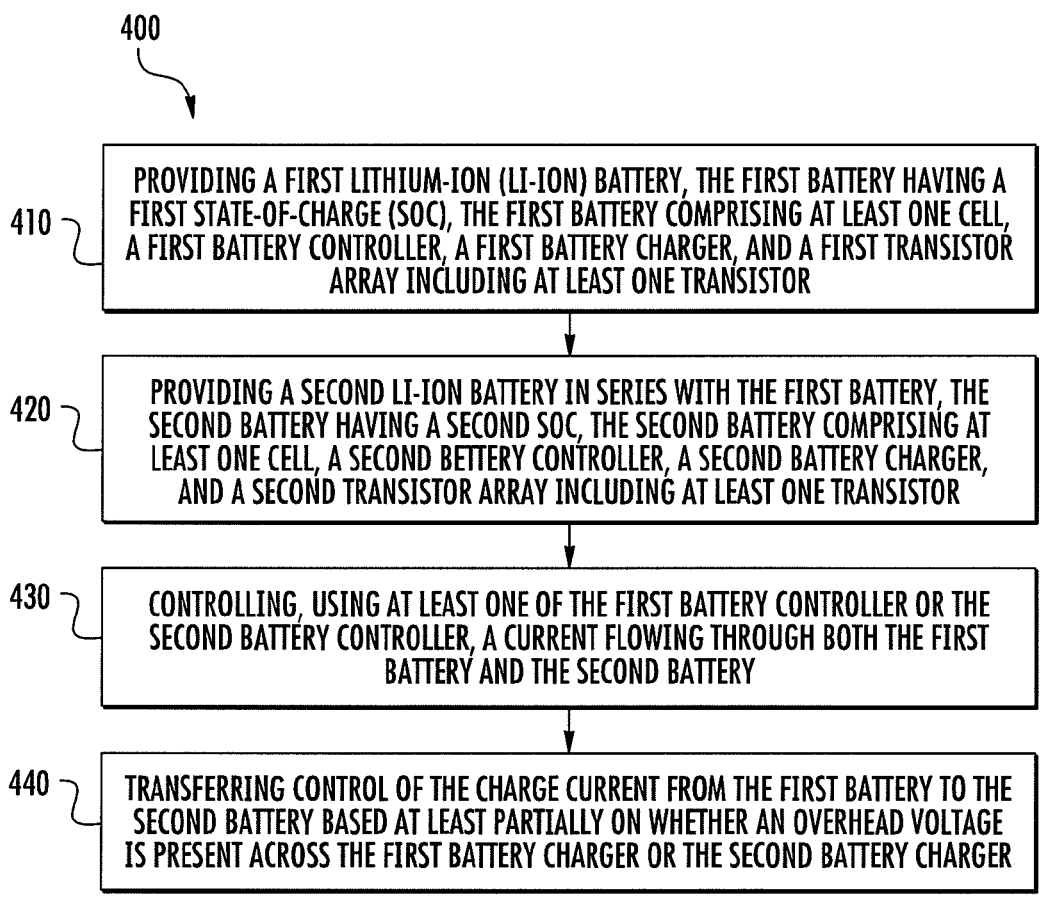
Figure 5:
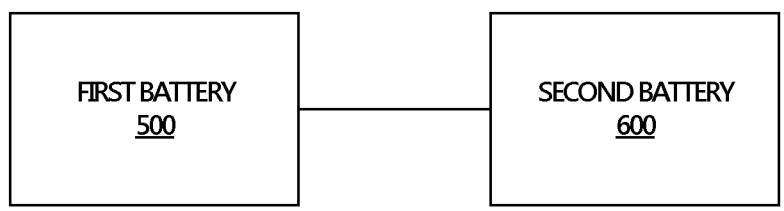

Having thus described embodiments of the invention in general terms, reference will now be made to the accompanying drawings, where:

FIG. 1 is a block-level diagram of a battery, in accordance with some embodiments of the present invention;

FIG. 2 (comprising FIGS. 2A and 2B) is a circuit-level diagram of a battery, in accordance with some embodiments of the present invention;

FIG. 3 is a graphical illustration associated with an overload protection module comprised in a battery, in accordance with some embodiments of the present invention;

FIG. 4 is a flow diagram illustrating an exemplary process flow associated with a battery, in accordance with some embodiments of the present invention; and FIG. 5 is a diagram depicting two batteries being connected in series.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Embodiments of the invention are direction to improving the performance characteristics of power circuits, batteries used in power circuits, and the electronics and control systems for such batteries. In some embodiments, multiple batteries (e.g., two batteries) that have different states of charge (SOC) are placed in a circuit. In some embodiments, the invention is directed to balancing the SOCs associated with the multiple batteries such that the maximum difference between SOCs associated with the multiple batteries does not exceed a predetermined threshold. In some embodiments, the multiple batteries are placed in series with respect to each other on a power circuit. A battery controller associated a series-connected battery determines when the battery controls the current flowing through the battery and determines when the battery does not control the current flowing through the battery. Control of the current is exchanged between the multiple batteries in order to control the SOC of the batteries and to control the temperature of the charging electronics within the batteries.

In some embodiments, the batteries are Lithium-ion (Li-ion) batteries. A Li-ion battery is a rechargeable battery in which lithium ions move from the negative electrode to the positive electrode during discharge, and move from the positive electrode to the negative electrode when charging. Embodiments of the invention are not limited to Li-ion batteries, and are directed to other types of batteries as well. The batteries described herein may be useful for several applications. For examples, the batteries may be useful in vehicles or automobiles. A battery described herein may be used to power the starter motor, the light, and the ignition system of a vehicle's engine. In some embodiments, the Li-ion battery described herein may be an iron phosphate Li-ion battery.

Components of the Battery

Referring now to FIG. 1, FIG. 1 presents a battery 100 according to embodiments of the present invention. The battery includes at least one cell module 110 that comprises at least one Li-ion cell. In some embodiments, the at least one Li-ion cell module 110 includes four cells in a parallel configuration along with three cells in a series configuration, or four cells in a series configuration. The invention is not limited to any maximum or minimum number of cells, and is not limited to any configuration (series or parallel or any combination thereof) for the cells. Additionally, the battery 100 includes presents a monitor and control electronics module 120 (may be referred to as the control module 120), a wake-up on load charge detect module 130 (may be referred to as the wake-up module 130), a case heater 140, a heater switch 150, an over-discharge power field effect transistor (FET) and overload protection module 160, a redundant over-charge power FET module 170, a current limiter and over-charge control module 180, an ideal diode circuit module 190, and a transient protection module 195. The battery 100 is not limited to the modules illustrated or described herein. In alternate embodiments, the invention may include more or less modules. Each of the modules illustrated herein may be electronically connected with the other modules as illustrated in FIG. 1. However, the electronic connections are not limited to those illustrated in FIG. 1. For example, even if two modules in FIG. 1 are illustrated as having no electronic interconnection, they may still be electronically connected to each other.

As illustrated in FIG. 1, the battery 100 includes a positive terminal 198 and a negative terminal 197. The positive terminal 198 may be connected to a vehicle power (e.g., +12V) socket. The negative terminal 197 may be connected to a return (e.g., 12V Return) socket. In alternate embodiments, the positive terminal 198 and the negative terminal 197 may be connected to sockets other than those described or illustrated herein. In some embodiments, the control module 120 may comprise at least one microcontroller and one or more other drivers, controllers, regulators, oscillators, charge pumps, voltage or current references, timers, and amplifiers to control the various modules presented in FIG. 1. As used herein, the control module 120 may also be referred to as the battery controller or the battery controller module. In some embodiments, the control module 120 may not only control the various modules associated with the battery 100 that comprises the control module 120, but the control module may also be able to control modules associated with other batteries that may be in connection with the battery 100 that comprises the control module 120. For the purposes of the present invention, a FET may be replaced by any other transistor (e.g., a bipolar junction transistor). Therefore, the invention is not limited to using FETs.

In some embodiments of the invention, multiple batteries (e.g., two batteries) such as those illustrated in FIG. 1 are connected in a series configuration on a power circuit. However, in other embodiments, multiple batteries may be connected in a different configuration (e.g., a parallel configuration or a combination of a series and parallel configuration) on a power circuit. In still other embodiments, a single battery of the type illustrated in FIG. 1 may be connected on a power circuit.

As used herein, a state of charge (SOC) associated with a battery (or a battery pack) refers to an amount of energy (or charge) comprised within the battery. The state of charge may be expressed as a percentage of full capacity of energy (or charge) that may be stored within the battery. There are several factors that affect the SOC of a battery. For example, the SOC may be affected by a usable capacity of the battery. As a further example, the SOC may be affected at least one of the charge rate (or efficiency) or discharge rate (or efficiency) associated with the battery. As a further example, hysteresis may affect the SOC. As a further example, the internal or external temperature associated with the battery may affect the SOC. As a further example, self-discharge of the battery may also affect the SOC. As a further example, the age of the battery may also affect the SOC. The SOC may be affected by other factors not described herein.

Referring now to FIG. 2 (comprising FIGS. 2A and 2B), FIG. 2 presents a circuit-level diagram of a battery system, in accordance with some embodiments of the present invention. For exemplary purposes, FIG. 2 presents a module 210 comprising a power path capable of 1100 A discharge current and also capable of 45 A charge current. The values of 1100 A and 45 A are for exemplary purposes, and embodiments of the invention are directed to any values for the discharge and charge current. This module comprises an over-discharge power field effect transistor (FET) and overload protection module 160, a redundant over-charge power FET module 170, an ideal diode circuit module 190, and a transient protection module 195.

Additionally, FIG. 2 presents a linear charge controller module 230. In some embodiments, the linear charge controller module 230 comprises the current limiter and over-charge control module 180 presented in FIG. 1. In other embodiments, the current limiter and over-charge control module 180 is comprised in module 210. In some embodiments, the linear charge controller module 230 may be part of the control module 120. In some embodiments, the linear charge controller module 230 may also be referred to as the linear charger, the charge regulator, or the battery regulator. The linear charge controller module 230 limits the rate at which charge current flows into the battery system. The linear charge controller module 230 may prevent the amount of charge (or SOC, rate of charge, etc.) associated with the battery (or a cell within the battery) from increasing to a level greater than or equal to a threshold maximum amount of charge (or SOC, rate of charge, etc.). Additionally, in some embodiments, the linear charge controller module 230 may prevent the voltage across the battery (or the voltage across a particular module of the battery) from increasing to a level greater than or equal to a threshold maximum voltage. In some embodiments, the charge controller module 230 may be a switching power converter charge controller module rather than a linear charge controller module.

Additionally, FIG. 2 presents a bypass heater module 220. Additionally, FIG. 2 presents a monitor and control electronics module 120 (i.e., the control module), which includes the wake-up on load or charge detect module 130. In some embodiments, the control module 120 may comprise at least one microcontroller and one or more other drivers, controllers, regulators, oscillators, charge pumps, voltage or current references, timers, and amplifiers to control the various modules presented in FIG. 2. Additionally, FIG. 2 presents the cell module 110. Additionally, FIG. 2 presents at least one temperature sensor module 240. The temperature sensor module 240 may be used to sense the temperature associated with one or more of the cells comprised in the cell module 110, or may be used to sense the temperature associated with any module or sub-module presented in FIG. 2.

Additionally, FIG. 2 presents a current shunt resistor 260. The current shunt resistor 260 may be used to measure the current (e.g., current flowing through the battery) based on the voltage drop across the current shunt resistor 260. In alternate embodiments of the invention, the current may be measured without the presence of a current shunt resistor 260.

As illustrated in FIG. 2, the battery includes a positive terminal 198 and a negative terminal 197. In alternate embodiments, the invention may include more or less modules. Each of the modules illustrated herein may be electronically connected with the other modules as illustrated in FIG. 2. However, the electronic connections are not limited to those illustrated in FIG. 2. For example, even if two modules (or two sub-modules within a module) in FIG. 2 are illustrated as having no electronic interconnection, they may still be electronically connected to each other.

Energy Shuttle Balancing

In some embodiments, embodiments of the invention are directed to energy shuttle balancing associated with the cells comprised within the cell module 110. Therefore, in some embodiments, one or more bidirectional converters (e.g., isolated bidirectional converters) may be used to transfer charge from one cell (e.g., an energy bank cell) to a recipient cell within the cell module 110. In some embodiments, when a first cell intends to transfer charge to a second cell, one or more bidirectional converters (e.g., isolated bidirectional converters) may be used to transfer charge from the first cell to a bank cell, and then to transfer charge from the bank cell to the second cell.

In some embodiments, the energy shuttle balancing process may be executed until the SOC associated with each recipient cell is substantially equal. In some embodiments, the energy shuttle balancing process may be executed periodically, or may be executed when the SOC associated with a particular recipient cell (or a particular minimum threshold number of recipient cells) falls below a certain SOC threshold, or may be executed when the variation between the maximum cell SOC and the minimum cell SOC exceeds a threshold. As used herein, a bidirectional converter permits transfer of energy from a first cell to a second cell, and also permits the transfer of energy in the reverse direction from the second cell to the first cell. The bidirectional converter may be a flyback converter Battery Controller In some embodiments, a battery controller (e.g., the monitor and controller electronics module 120 in FIG. 1) is provided for a battery (e.g., for a battery connected in series in a power circuit described herein). In some embodiments, the battery controller is in control of at least one regulator (e.g., a linear or non-linear regulator). The battery controller periodically evaluates or determines the state of charge imbalance within a single battery (e.g., between two or more cells in a single battery). In some embodiments, this determination is conducted when the battery is stored and is inactive.

In some embodiments where the battery controller evaluates the state of charge (SOC) imbalance within a single battery, the battery controller determines whether the SOC difference between the multiple cells in the single battery is less than or equal to a predetermined threshold difference. If the battery controller determines that the SOC difference between the multiple cells is not less than or equal to a predetermined threshold difference, the battery controller performs one or more functions so that the charge difference between the multiple cells is less than or equal to a predetermined threshold difference.

Battery Level Charge Bypass

When a battery is charged fully (e.g., the SOC associated with the battery is greater than a predetermined threshold), a bypass module (may also be referred to as a bypass or a battery level charge bypass) is triggered that diverts the current around the fully charged battery to the other batteries. Therefore, in some embodiments, a bypass is provided for batteries (e.g., for batteries connected in series). In some embodiments, the bypass is a bypass resistive element or resistor that is included in a battery. The bypass is triggered to turn on when the battery is fully charged or reaches a predetermined level of charge (e.g., a predetermined maximum level of charge). When the bypass is turned on, the bypass provides an alternate path for the current such that the current does not flow through the battery; instead, the bypass may divert the current to flow through the bypass providing a means to continue charging the other battery in series. In some embodiments, the bypass comprises a resistive element (e.g., a resistor) and a switch.

Battery Level Charge Coordination

In some embodiments, the invention enables charge coordination between batteries (e.g., for multiple batteries connected in series). Each series-connected battery on a battery bus comprises a linear charger (referred to as linear charge controller 230 in FIG. 2) that produces constant current at a selectable charge rate. A battery controller inside the battery may adjust the charge rate of the linear charger. Additionally, each battery comprises a bypass module that allows current (e.g., charge current) to flow around each battery and into the other battery. The charge coordination process described herein is based on overhead voltage sharing. As used herein, the overhead voltage is the voltage appearing across the charge regulator. Therefore, the overhead voltage is the difference between the battery bus or terminal voltage and the sum of the voltages of the cells in the battery.

As explained in the example below, the overhead voltage is dropped across only one of the batteries. For example, the overhead voltage is dropped across the first battery, and not the second battery, when the overhead voltage is being regulated by the first battery's linear charger. The battery that has the overhead voltage controls the charge rate of that battery and also accumulates the heat associated with regulating the charging process. The battery that has the overhead voltage also controls the current that flows through both series-connected batteries.

As an example, the first battery grabs the overhead voltage and regulates the charging of the first battery for a predetermined period of time (e.g., thirty seconds) before the second battery grabs the overhead voltage from the first battery. The battery that has the overhead voltage sets its linear charge rate to a predetermined percentage threshold (e.g., 90%), and the other battery sets its linear charge rate to a higher predetermined percentage threshold (e.g., 100%). The battery with the lower charge rate has the overhead voltage and determines current flow through both batteries.

When one of the batteries reaches end of charge, it activates its bypass module and allows the other battery to charge itself. Therefore, the charge coordination process described herein prevents overcharging of a battery. As used herein, an "end of charge" state occurs when the SOC of a battery is equal to or greater than a predetermined threshold SOC (e.g., 90%, 100%, etc.). As explained below in the specification, the bypass module also serves as a heat source to heat the cells in the battery when the battery is too cold to allow charging of the battery.

In some embodiments, the linear charger or the battery controller that controls the linear charger tapers the charge rate of a battery based on voltages of the cells in the battery, the temperature of the linear charger, or the temperature of the cells in the battery in order to protect the various modules in the battery.

Each battery in the series configuration may independently execute the charging process described herein and the coordination between the batteries occurs through the sharing of the overhead voltage. The charging process described herein works even when a battery is the only battery in a power circuit. Since another battery is not present in a series configuration, the charging process charges the battery without having to pass the overhead voltage back and forth with another battery.

An example of an embodiment of the invention is when the charge voltage associated with a charge source is 28V. In an embodiment where there are two batteries in series, each battery has a voltage of 12V. The remaining 4V is dropped across the first battery's battery charger. The 4V dropped across the first battery's battery charger is the overhead voltage. Since the overhead voltage is dropped across the battery charger and not across the first battery, the first battery's battery controller can successfully limit the first battery's charge rate. Therefore, the first battery is in control of the current flowing through both batteries. When the overhead voltage is dropped across the first battery's battery charger, the charge rate of the first battery (e.g., 90%) is set by the first battery's battery controller to be lower than the charge rate of the second battery (e.g., 100%). Since the second battery's battery controller determines that the overhead voltage is not dropped across the second battery's battery charger, the second battery's battery controller may increase the charge rate of the second battery to a predetermined maximum threshold (e.g., 100%). The battery charger associated with either the first battery or the second battery may be a linear charger or non-linear charger (or a switching charger).

After a predetermined period of time, the second battery grabs the overhead voltage (i.e., the overhead voltage is transferred to the second battery's battery charger) by reducing its own charge rate (e.g., from 100% to 90%). The first battery's battery controller detects the loss of overhead voltage, and then increases the charge rate of the first battery to a predetermined maximum threshold (e.g., 100%) to allow the second battery to maintain control of the overhead voltage. When the overhead voltage is transferred to the second battery's battery charger, the second battery is in control of the current that flows through both batteries. Therefore, using the charge coordination process described herein, the batteries can coordinate charging without communicating any data or information bits between the two batteries. Additionally, the charge coordination process described herein prevents the batteries from overcharging.

Control Hand-Off and Variations in Current Amplitude

In some embodiments, the battery controller enables charge coordination between the batteries by detecting variations in the time between control hand-off, or else by detecting variations in the current amplitude associated with a battery. In some embodiments, control hand-off refers to an instant (or a period of time) when control of the current passes from a first battery to a second battery. Therefore, in some embodiments, the time period associated with control hand-off refers to the time period between the first battery giving up or transferring control of the current and the second battery receiving or initiating control of the current. In other embodiments, the time period associated with control hand-off refers to the time period between the first battery initiating control over the current and the first battery giving up control of the current. This time period may correspond to the time period associated with the overhead voltage being dropped across the first battery's charger. Therefore, a battery may increase or decrease its current based at least partially on a duration associated with control hand-off.

In some embodiments, a battery may increase or decrease its current based at least partially on detecting or determining whether an amount of increase or decrease in the current amplitude associated with current (e.g., charge current) flowing through the battery is greater than a predetermined threshold and/or whether a change in current amplitude occurs within a predetermined threshold period of time. In embodiments described herein, a battery may increase or decrease its current based at least partially on a battery controller that performs a function that causes the battery to increase or decrease its current.

Other than charge coordination, in some embodiments, the battery controller also enables coordination for other features or technical characteristics associated with the batteries. Therefore, data associated with these features or technical characteristics may be exchanged between the multiple batteries. For example, the battery controller enables coordination between the batteries for the thermal load, the state of charge, the state of balance, and the end-of-charge detection to allow entry into sleep mode. In some embodiments, the thermal load may refer to the amount of heat (or the temperature) associated with (or produced by) the battery or associated with a particular module of the battery. As used herein, the end-of-charge detection event refers to one or more trigger events that determine when the battery transitions to sleep mode.

The SOC associated with a battery has been described previously. In some embodiments, the SOC is coordinated in embodiments where a switching charger is used. The switching charger is described in further detail below. Individual cells in a battery may have different capacities and may be associated with different SOC levels. As used herein, the capacity of a cell is the amount of electric charge that it can store. In some embodiments, battery balancing refers to transferring charge from or to individual cells until SOCs of all cells are substantially equal. Therefore, the state of balance associated with a battery refers to the difference between the SOC values associated with the individual cells comprised within the battery.

Other Communication Between Batteries

In some embodiments, the batteries (e.g., the batteries that alternately impose control over the current) in the power circuit may communicate (e.g., via a digital wired or wireless mechanism) with each other and exchange (e.g., transmit and/or receive) commands, responses, or other data. In some embodiments, the data may be exchanged based on leveraging duty cycle information associated with each battery. For example, information bits may be transmitted from a first battery to a second battery during a first predetermined time period, and information bits may be transmitted from the second battery to the first battery during the second predetermined time period.

Battery Coordination Effected by Changing Charge Voltage Across Individual Batteries Additionally or alternatively, in some embodiments, the battery controller (e.g., associated with the first battery) is triggered to change the charge voltage across a first battery in response to detecting a change in current flowing through the battery. In such embodiments, the battery controller causes reduction in current flowing through the first battery until the other battery's (e.g., the second battery) overhead voltage (or the voltage across the other battery itself) is substantially reduced. In such embodiments, the second battery does not need to have the ability to measure its own current.

Battery Overload Protection

As indicated in FIG. 1, an over-discharge power field effect transistor (FET) and overload protection module 160 (may be shortened to overload protection module 160) is provided in the battery. In some embodiments, this module comprises an array of transistors, a current transducer, an amplification and comparator circuit, one or more timing circuits, a microcontroller, etc. The overload protection module 160 measures the current signal (or the rate of increase or decrease of the current signal) using a detection circuit and/or a digital controller that evaluates the current using an appropriate software algorithm (e.g., an $I^2t$ algorithm). As used herein, the current signal is the signal associated with the current flowing through the battery. The overload protection module 160 (e.g., using the comparator circuit) compares the current signal with a reference value (e.g., a maximum current threshold) in order to detect any increase in the current signal and to detect whether the increased current signal is equal to or greater than a maximum current threshold. The overload protection module 160 triggers the setting of an overload signal when the current signal is equal to or greater than the maximum current threshold. When the overload signal is set, the array of transistors (e.g., the DFET array described herein) is immediately turned off, thereby disabling battery output. As used herein, the array of transistors or DFET array refers to the array of transistors associated with the overload protection module 160.

In some embodiments, the overload protection module 160 monitors or determines whether the current signal is greater than or equal to a second threshold, where the second threshold is lower than the maximum current threshold. When the current signal is determined to be equal to or greater than the second threshold (or second reference value), a countdown timer (or a predetermined countdown time period) is started. When the countdown timer expires, the maximum current threshold is reduced to the second threshold value. The purpose of reducing the maximum current threshold is to allow or facilitate the initial engagement surge that results from starting the engine of a vehicle (in embodiments where the battery described herein is used in a power circuit in a vehicle).

When the countdown timer expires and the maximum current threshold is reduced, the overload protection module 160 monitors or determines whether the current falls below or is equal to a third threshold. This third threshold is less than the previously described first threshold and second threshold. When the current signal reduces to the third threshold for a predetermined minimum period of time, the first countdown timer is reset and the maximum current threshold is again set to the first threshold value and an additional initial engagement surge may be reapplied to the battery.

Referring now to FIG. 3, FIG. 3 illustrates the first threshold 310, the second threshold 320, and the third threshold 330 described herein. The initial engagement surge described above may be reapplied at the time 350 indicated in FIG. 3. Time 340 may indicate the time at which the $I^2t$ algorithm is applied in order to measure the current signal. The various processes associated with the overload protection module may be implemented in at least one of hardware or software.

Reserve Protect

In some embodiments, the battery controller compares a SOC associated with a battery to a table (or database) of SOC values (e.g., a table of minimum values for starting a vehicle). This table may be stored in a memory module located in the battery. This table includes SOC values versus temperature values, with different SOC values for "warn" versus "alarm" triggers. Once the SOC reduces to the warning value in the table at a particular temperature (e.g., the current temperature), the battery sends a warning message to a host device over a communication channel (e.g., a wired or wireless communication channel) that a "reserve protect" setpoint has been reached. As used herein, a host device is a computing device external to the battery, and is in communication (e.g., via a wired or wireless communication channel) with the battery. If a "reserve protect" override command is not received at the battery from the host device (and/or the SOC does not increase to a value greater than the warning value) within a predetermined period of time, the battery will turn its output off within a preset time once the "reserve protect" SOC alarm value in the table at the particular temperature (e.g., the current temperature) is reached. The battery turns its output off to protect a "reserve" amount of charge in the battery. In some embodiments, the SOC alarm value may be at least one of equal to or less than the SOC warn value. This "reserve" amount is preserved and the battery can be used to provide this reserve amount of charge for emergency applications. Additionally or alternatively, a user of the battery may enable the use of the reserve amount of charge by reactivating the battery using one or more activation mechanisms (or reserve activation mechanisms) associated with the battery.

Arrangement of Modules within Battery

In some embodiments, the arrangement of the various modules (e.g., the arrangement of at least one of modules 160, 170, 180, or 190) in the battery enables high output current with very low voltage drop through the power path and low power dissipation. In some embodiments, the output current extends to thousands of Amperes. Embodiments of the invention are not limited to any minimum or maximum output current. Additionally, the arrangement of modules produces limited charge current, and the amount of charge current flowing through the battery may be reduced or increased by the battery controller. Additionally, the battery provides short circuit protection. Still additionally, the battery enables detection of a charge source or determination of current flowing through the battery. Still additionally, the battery includes a battery bypass resistive element that provides a secondary function of heating the battery in a cold charge environment. As used herein, a cold charge environment is an environment where at least one of the internal (or external) temperature associated with the battery or associated with a particular module of the battery (e.g., the cell module 110) is determined to be less than or equal to a predetermined threshold temperature.

Control of Inductive Kick

In some embodiments, one or more metal oxide varistor (MOV) devices arranged in an array located electrically in parallel and physically close to the DFET array are provided in order to control the inductive kick (e.g., a transient voltage spike) resulting from the fast turn-off of the DFET array. As used herein, "fast" turn-off refers to turning off or deactivating one or more (or all) of the FETs in the DFET array within a predetermined amount of time. As used herein, "fast" turn-on refers to turning on or activating one or more (or all) of the FETs in the DFET array within a predetermined amount of time. In embodiments described herein, the DFET array is part of the overload protection module 160. As used herein, an MOV device is an electronic component with diode-like nonlinear current-voltage characteristics. An MOV device as used herein may protect the power circuit against excessive transient voltages.

In general, a varistor may also be known as a voltage dependent resistor (VDR). A varistor has the capability to conduct a significantly higher amount of current when the voltage is excessive. When the MOV device is triggered or activated, the MOV device shunts the current created by the excessive transient voltage away from sensitive components (e.g., the DFET array) of the power circuit. Embodiments of the invention are not limited to MOV devices, and other embodiments of the invention may incorporate other type of varistors rather than metal-oxide varistors. A MOV device, rather than a freewheeling diode, is used to control the inductive kick because a freewheeling diode cannot be used when multiple batteries (e.g., two batteries) are connected in series. This is because if one of the multiple batteries (e.g., a first battery) is deactivated or switched off, the other battery pushes current (e.g., a full or maximum amount of current) through the freewheeling diode associated with the first battery, thereby resulting in electrical damage to at least one of the freewheeling diode or the first battery. In some embodiments, the transient protection module 195 may comprise a varistor. However, in other embodiments, the transient protection module 195 may additionally or alternatively comprise other transient protection components.

Charge Detection

In some embodiments, the battery (or any of the modules in the battery such as the battery controller module) detects the battery charge (or determines presence of a charge source) by monitoring the voltage between the cell module 110 and the outside terminal 197, 198.

Discharge Detection

In some embodiments, the battery (or any of the modules in the battery such as the battery controller module 120) detects battery discharge by monitoring current through at least one resistor (e.g., a 100 Ohms resistor) that is in parallel to the DFET array. In some embodiments, the battery makes this detection when the DFETs in the DFET array are powered off.

Ideal Diode Circuit Implementation

In some embodiments, an ideal diode circuit module 190 is provided. The ideal diode circuit module 190 can be used for high transient voltage applications. The ideal diode circuit module 190 of this invention differs from commercially available units that cannot handle high transient voltages (e.g., transient voltage greater than a predetermined threshold). In some embodiments, the amount of the transient voltage may extend to hundreds of volts. Embodiments of the invention are not limited to any maximum or minimum amount of transient voltage. A purpose of providing an ideal diode circuit module 190 is to reduce heat dissipation in the battery and to prevent charge current from reentering the battery.

The ideal diode circuit module 190 monitors the forward voltage drop across a FET (e.g., voltage between the drain and source terminals of the FET) and adjusts the FET's gate voltage to maintain a small forward voltage drop (e.g., 50 mV) across the FET. Therefore, if the ideal diode circuit module 190 determines that the forward voltage drop across the FET decreases to a minimum threshold level, the ideal circuit module 190 adjusts the FET's gate voltage (e.g., decreases the gate voltage) such that the forward voltage drop is maintained at or above the minimum threshold level. If the ideal diode circuit module 190 detects that the voltage across the FET reverses (e.g., the polarity of the voltage is reversed), the ideal diode circuit module 190 quickly pulls charge from the FET gate, consequently turning off the FET. In embodiments described herein, turning off or deactivating a FET may refer to turning off or deactivating an entire FET array. A FET as described herein may be a FET situated anywhere in the battery. For example, the FET may be a FET that is situated in module 160 (e.g., a FET that is part of the DFET array) or module 170.

Switching Charger

In some embodiments, a switching charger is integrated into the battery instead of a linear charger. The switching charger reduces heat dissipation when compared to a linear charger, and can therefore be used for high voltage applications. In some embodiments, the switching charger is a current-mode step-down buck converter. The converter operates at close to (or equal to) 100% duty cycle (with high power efficiency) when the cell stack voltage approaches the charge source voltage. As used herein, the duty cycle is the time that the converter spends in an active state as a fraction or percentage of the total time under consideration. As used herein, the cell stack is the cell module 110 presented in FIG. 1. In some embodiments, the charge rate associated with at least one of the charge source or the cell module 110 can be controlled by the battery controller described herein. The charge rate may be the rate at which charge is provided by the charge source and/or the rate of which charge is received by the cell module 110. As used herein, a charge source may be a charger (internal to the battery or external to the battery) that can be used to charge the cell module 110. An external charge source may be connected to the battery either via the terminals 197, 198 displayed in FIG. 1, or via other terminals not displayed in FIG. 1.

Low Temperature Charging

In some embodiments, the system described herein is enabled to charge the battery at low temperatures. In some embodiments, the battery limits the charge rate at low temperatures (e.g., temperatures below a predetermined threshold temperature). Therefore, the charge rate cannot increase beyond a threshold rate at low temperatures. Additionally, if the battery (or the control module 120) detects that the SOC is below a predetermined threshold, and if at low temperatures or temperatures below a predetermined threshold temperature, and if the battery (or the control module 120) detects a charge source being connected to the battery, the battery activates a resistive heater (e.g., the bypass module) that provides heat to the cell module 110.

As the temperature increases (e.g., the temperature of the cell module 110), the current (e.g., the charge current) is increased and the charge rate increases until a predetermined maximum charge current (or charge rate) is reached. In some embodiments, the quantities of "charge current" and "charge rate" may be used interchangeably. Additionally, when the temperature is determined to be equal to or greater than a predetermined threshold temperature (e.g., a high temperature), the resistive heater is deactivated. In some embodiments, the resistive heater may be represented by the case heater module 140 in FIG. 1. A heater switch 150 to activate or deactivate the resistive heater is also presented in FIG. 1. This heater switch 150 may be controlled by the control module 120. Alternatively or additionally, the heater switch 150 may be operated by a user of the system.

Sleep Mode Transition

In some embodiments, a transition is provided for the battery from an active mode when the battery provides output current to a sleep mode (or an inactive or deactivated mode) when the battery does not provide substantial output current. One or more trigger events determine when the battery transitions to sleep mode. In some embodiments, the sleep mode is activated when the output current of the battery remains below a predetermined threshold amount for a predetermined period of time. Additionally or alternatively, in some embodiments, the sleep mode is activated when, over a predetermined period of time (e.g. several hours), the change in SOC (e.g., as evidenced by change in the cell module 110 voltage) for the battery is below a certain threshold amount of change (e.g., when the change in SOC is approximately zero). The sleep mode is activated by deactivating or turning off the DFET array described herein and activating (if previously deactivated) a previously deactivated wake-up module 130. The wake-up module 130, which comprises a wake-up circuit, may be configured to transition the battery from the sleep mode to the active mode (e.g., by turning on or activating the DFET array) when the wake-up circuit determines that the current of the battery is greater than or equal to a predetermined threshold amount.

Iron Phosphate SOC Algorithm

The SOC of each cell in the battery is stored (e.g., in a memory module in the battery). In some embodiments, the process of determining the SOC of a cell includes performing compensations for cell voltage, coulomb counting, and self-discharge. Coulomb counting is the primary means of tracking cell SOC during battery operation, but when conditions allow, the cell SOCs are updated with open-circuit voltage-based (OCV-based) values. As used herein, coulomb counting includes measuring the current flowing through the cell and generating a time-based mathematical integration of the current signal. As used herein, the OCV-based method includes reading the voltage across the cell and converting the voltage to a SOC value based on a known voltage versus SOC curve for the cell.

The OCV-based values have greater certainty at specific regions of SOC, and it is while in these regions at sufficiently low current levels that the SOC-based values will be superior in certainty to the coulomb-counting-based values. On wake-up of a battery, stored SOCs for each cell are evaluated with respect to expected self-discharge rates and storage time, and the corresponding predictions of SOCs are made. At the same time, the OCVs are measured and the OCV-based SOC values are compared to the last-stored SOCs as debited by the estimated self-discharge amounts. The least uncertain of the two measurements is stored for each cell.

As used herein, self-discharge is a phenomenon by which internal processes (e.g., internal chemical reactions) within the cell reduce the stored charge in the cell. The rate of self-discharge is the rate at which the stored charge of the cell decreases as a function of time. As used herein, the storage time may be the time of inactivity associated with the cell (or battery), or the time associated with the cell (or battery) being in sleep mode.

During the process of coulomb counting, uncertainties are introduced into the coulomb-counting-based SOC for each cell. In some embodiments, the upper and lower bounds of the SOC of each cell are presented (e.g., transmitted via a wired or wireless mechanism) to a host device. The host device or a user of the host device may determine whether the uncertainties warrant action. If the uncertainties in the cell SOC warrant certain actions, i.e., the host device may send an instruction to the battery to initiate a full charge or discharge of the cell to eliminate the uncertainty.

Low-Side Rail Implementation

In some embodiments, the various modules (e.g., the transistor array such as the DFET array, described with n-channel MOSFETs in this example) may be positioned on the low-side rail instead of the high-side rail. As used herein, a rail may refer to a power supply or voltage rail. When a Charge FET is positioned on the high-side rail, the source is connected to positive power rail, the drain is connected to the load (which then connects to the negative power rail), and the gate voltage is increased above the rail voltage to turn on the FET. When a Charge FET is positioned on the low-side rail, the load is connected between the positive terminal and the source of the Charge FET. The drain of the charge FET is connected to the negative power rail, and the gate is driven to a voltage above the source to turn on the FET.

Alternate Method of Determining Current Flowing Through a Battery

As explained previously, in some embodiments of the invention, the current flowing through the battery may be determined based on measuring a voltage across the shunt resistor 260 presented in FIG. 2. In further embodiments of the invention, the current flowing through the battery may be determined based at least partially on at least one of the temperature (e.g., junction temperature) associated with a FET (e.g., the DFET array) and/or the voltage across the FET located in the battery.

Process Flow

Referring now to FIG. 4, FIG. 4 presents a process flow 400 associated with a battery, in accordance with one embodiment of the present invention. The various process blocks presented in FIG. 4 may be executed in an order that is different from that presented in FIG. 4. At block 410, the method comprises providing a first lithium-ion (Li-ion) battery, the first battery having a first state-of-charge (SOC), the first battery comprising at least one cell, a first battery controller, a first battery charger, and a first transistor array including at least one transistor. At block 420, the method comprises providing a second Li-ion battery in series with the first battery, the second battery having a second SOC, the second battery comprising at least one cell, a second battery controller, a second battery charger, and a second transistor array including at least one transistor. In this regard, FIG. 5 depicts two batteries (or battery packs), namely a first battery 500 and a second battery 600, being connected in series. At block 430, the method comprises controlling, using at least one of the first battery controller or the second battery controller, a current flowing through at least one of the first battery and the second battery. At block 440, the method comprises transferring control of the current from the first battery to the second battery based at least partially on whether an overhead voltage is present across the first battery charger or the second battery charger. Additionally or alternatively, at block 440, the method comprises transferring control of the current from the first battery to the second battery based at least partially on at least one of data transmitted from the first battery to the second battery, or data received by the first battery from the second battery. Additionally or alternatively, at block 440, the method comprises transferring control of the charge current from the first battery to the second battery based at least partially on a voltage across at least one of the first battery, the first battery charger, the second battery, or the second battery charger. Additionally or alternatively, at block 440, the method comprises transferring control of the charge current from the first battery to the second battery based at least partially on at least one of a duration between the first battery's transfer of control of the charge current and the second battery's reception of control of the charge current, or a variation in amplitude of the charge current flowing through at least one of the first battery and the second battery.

In some embodiments, the various battery systems described herein may comprise at least one processor, at least one memory, and at least one module stored in the memory that is executable to perform or to cause one or more other modules to perform the various processes described herein. In accordance with embodiments of the invention, the term "module" with respect to a system (or a device) may refer to a hardware component of the system, a software component of the system, or a component of the system that includes both hardware and software. As used herein, a module may include one or more modules, where each module may reside in separate pieces of hardware or software.

In some embodiments, an exemplary computer program product for performing one or more functions or processes associated with a battery system described herein comprises a non-transitory computer readable medium comprising code configured to perform one or more processes or functions described herein or to cause one or more systems described herein to perform one or more processes or functions described herein.

As used herein, the term "automatic" refers to a function, a process, a method, or any part thereof, which is executed by computer software upon occurrence of an event or a condition without intervention by a user. As used herein, the phrase "greater than" means "greater than or equal to."

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system comprising:
   a first lithium-ion (Li-ion) battery pack, the first battery pack having a first state-of-charge (SOC), the first battery pack comprising at least one cell, a first battery controller, a first battery charger, and a first transistor array including one or more transistors; and
   a second Li-ion battery pack in series with the first battery pack, the second battery pack having a second SOC, the second battery pack comprising at least one cell, a second battery controller, a second battery charger and a second transistor array including one or more transistors,
   wherein at least one of the first battery controller or the second battery controller controls a charge current flowing through at least one of the first battery pack and the second battery pack, wherein control of the charge current is transferred from the first battery pack to the second battery pack based at least partially on whether an overhead voltage is present across the first battery charger or the second battery charger;
   wherein the first battery controller and second battery controller are configured so that: (1) when the first battery controller sets a charge rate of the first battery pack to be less than a charge rate of the second battery pack, the overhead voltage then appears across the first battery charger, but not the second battery charger; and (2) when the overhead voltage is present across the second battery charger, but not the first battery charger, the first battery controller sets the charge rate of the first battery pack to be greater than the charge rate of the second battery pack.

2. The system of claim 1, wherein the overhead voltage is transferred from the first battery pack to the second battery pack after a predetermined period of time.

3. The system of claim 1, wherein control of the charge current is transferred from the first battery pack to the second battery pack based at least partially on at least one of a duration between the first battery pack's transfer of control of the charge current and the second battery pack's reception of control of the charge current, or a variation in amplitude of the charge current flowing through at least one of the first battery pack and the second battery pack.

4. The system of claim 1, wherein control of the charge current is transferred from the first battery pack to the second battery pack based on at least one of a state of charge, a state of balance, a thermal load, or an end-of-charge detection event associated with at least one of the first battery pack or the second battery pack.

5. The system of claim 1, wherein control of the charge current is transferred from the first battery pack to the second battery pack based on data exchanged between the first battery pack and the second battery pack.

6. The system of claim 1, wherein the first battery controller tapers the charge rate of the first battery pack based at least partially on at least one of: a voltage of the at least one cell comprised in the first battery pack, a temperature of the first battery charger, or a temperature of at least one cell comprised in the first battery pack.

7. The system of claim 1, wherein the first battery pack further comprises a bypass module, the bypass module being activated when the first SOC is greater than or equal to a threshold SOC such that that the bypass module diverts the charge current around the first battery pack, and the bypass module additionally providing heat to the first battery pack when a temperature associated with the first battery pack drops below a threshold temperature.

8. The system of claim 1, wherein the first battery pack further comprises at least one isolated bidirectional converter to transfer energy from a first cell to a second cell comprised in the first battery pack.

9. The system of claim 1, wherein the first battery controller determines whether a third SOC associated with a first cell comprised in the first battery pack is different from a fourth SOC associated with a second cell comprised in the first battery pack.

10. The system of claim 1, wherein the first battery pack further comprises an overload protection module for performing the steps of:
measuring a current flowing through the first battery pack, comparing the measured current with a first reference value, and
in response to determining the measured current is greater than or equal to the first reference value, setting an overload signal that triggers at least one of deactivation of the first transistor array or disabling of the first battery pack output.

11. The system of claim 10, wherein the overload protection module further performs the steps of:
comparing the measured current with a second reference value, wherein the second reference value is less than or equal to the first reference value,
starting a countdown period, and
reducing the overload signal to the second reference value upon expiration of the countdown period.

12. The system of claim 11, wherein the overload protection module further performs the steps of:
comparing the measured current with a third reference value, wherein the third reference value is less than the first and second reference values, and
in response to determining the measured current is equal to or less than the third reference value for a set period of time, resetting the overload threshold to the first reference value and resetting the countdown period.

13. The system of claim 1, wherein the first battery pack further comprises a reserve protection module for performing the steps of:
comparing the first SOC to a plurality of values stored in a memory module,
determining whether the first SOC is less than or equal to a warning value,
in response to determining the first SOC is less than or equal to the warning value, sending a warning message to a host device located external to the first battery pack, and
in response to not receiving an override command from the host device within a predetermined period of time and in response to determining the first SOC reduces to an alarm value, deactivating the first battery pack output, wherein the alarm value is less than or equal to the warning value.

14. The system of claim 1, wherein the first battery pack further comprises a varistor for controlling an inductive kick associated with deactivation of the first transistor array.

15. The system of claim 1, wherein the first battery controller detects presence of a charge source based at least partially on the first battery controller's determination of a difference between a sum of voltages of series-connected cells comprised in the first battery pack and the first battery pack terminal voltage.

16. The system of claim 1, wherein the first battery controller determines discharge associated with the first battery pack based at least partially on determining a current through at least one resistor in parallel with the first transistor array when the first transistor array is off.

17. The system of claim 1, wherein the first battery pack further comprises an ideal diode circuit for performing the steps of:
monitoring a forward voltage across at least one transistor located in the first battery pack,
adjusting the at least one transistor's gate voltage such that the forward voltage is greater than a threshold voltage, and
in response to determining at least one of a reversal of the forward voltage across the at least one transistor or a reduction in the forward voltage such that the forward voltage is less than or equal to the threshold voltage, deactivating the at least one transistor.

18. The system of claim 1, wherein the first charger is a switching charger, wherein the switching charger comprises a step-down Buck converter.

19. The system of claim 1, wherein at least one of the first battery controller or a module associated with the first battery pack performs the steps of:
limiting the charge rate for the first battery pack when a temperature associated with the first battery pack is less than a first temperature threshold,
determining that the first SOC is less than a SOC threshold,
in response to determining the first SOC is less than the SOC threshold, and determining that a charge voltage is present, activating a resistive heater to provide heat to the at least one cell comprised in the first battery pack, and
deactivating the resistive heater when the temperature associated with the first battery pack is determined to be greater than or equal to a temperature threshold.

20. The system of claim 1, wherein the first battery pack transitions from an active mode to a sleep mode when at least one of: the battery current remains within a threshold range of a zero level for a predetermined period of time, or a change associated with the first SOC does not exceed a threshold amount of change over a predetermined period of time, and wherein the first transistor array is deactivated when the first battery pack transitions from the active mode to the sleep mode.

21. The system of claim 1, wherein the first battery controller determines a cell SOC associated with a cell in the first battery pack and stores the cell SOC in a memory module comprised in the first battery pack, wherein the first battery controller determines the cell SOC based at least partially on at least one of: measuring a current through the cell, or measuring a voltage across the cell, and converting the measured voltage to the cell SOC based at least partially on accessing a database comprising a list of known voltages versus SOC values.

22. The system of claim 1, wherein when the first battery pack transitions from a sleep mode to an active mode, the first battery controller:
determines a first cell SOC based at least partially on at least one of a self-discharge rate associated with a cell in the battery, and a storage time associated with the cell,
determines a second cell SOC based at least partially on measuring a voltage across the cell, and converting the measured voltage to the second cell SOC based at least partially on accessing a database comprising a list of known voltages versus SOC values, determines whether the first cell SOC is less uncertain than the second cell SOC, and stores the less uncertain SOC between the first cell SOC and the second cell SOC as an updated SOC value for the cell.

23. The system of claim 1, wherein at least one of the first transistor array or the second transistor array is positioned on at least one of a high-side rail or a low-side rail comprised in the system.

24. The system of claim 1, wherein a current flowing through the first battery pack is determined based at least partially on at least one of: a voltage across a shunt resistor, a temperature associated with the first transistor array or a voltage across the first transistor array.

25. The system of claim 1, wherein the first battery controller is configured to grab the overhead voltage so that the overhead voltage appears across the first battery charger by reducing the charge rate of the first battery pack.

26. The system of claim 1, wherein, in response to detecting loss of the overhead voltage, the first battery controller is configured to increase charge rate of the first battery pack.

27. The system of claim 1, wherein control of the charge current is transferred from the first battery pack to the second battery pack without any data exchanged between the first battery pack and the second battery pack.

28. A method comprising:

providing a first lithium-ion (Li-ion) battery pack, the first battery pack having a first state-of-charge (SOC), the first battery pack comprising at least one cell, a first battery controller, a first battery charger, and a first transistor array including one or more transistors;

providing a second Li-ion battery pack in series with the first battery pack, the second battery pack having a second SOC, the second battery pack comprising at least one cell, a second battery controller, a second battery charger, and a second transistor array including one or more transistors;

controlling, using at least one of the first battery controller or the second battery controller, a current flowing through at least one of the first battery pack and the second battery pack; and transferring control of the current from the first battery pack to the second battery pack based at least partially on whether an overhead voltage is present across the first battery charger or the second battery charger;

wherein the first battery controller and second battery controller are configured so that: (1) when the first battery controller sets a charge rate of the first battery pack to be less than a charge rate of the second battery pack, the overhead voltage then appears across the first battery charger, but not the second battery charger; and (2) when the overhead voltage is present across the second battery charger, but not the first battery charger, the first battery controller sets the charge rate of the first battery pack to be greater than the charge rate of the second battery pack.

\* \* \* \* \*

UNITED STATES PATENT AND TRADEMARK OFFICE
CERTIFICATE OF CORRECTION

PATENT NO. : 10,090,682 B2  
APPLICATION NO. : 14/412009  
DATED : October 2, 2018  
INVENTOR(S) : James G. Snyder et al.

Page 1 of 1

It is certified that error appears in the above-identified patent and that said Letters Patent is hereby corrected as shown below:

On the Title Page

Item (71), replace Jacksonville, FL (US) with Cockeysville, MD (US)

Signed and Sealed this  
Eleventh Day of December, 2018

Andrei Iancu  
*Director of the United States Patent and Trademark Office*